(12) United States Patent
Matsusue

(10) Patent No.: US 11,688,865 B2
(45) Date of Patent: Jun. 27, 2023

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/653,408

(22) Filed: Mar. 3, 2022

(65) Prior Publication Data

US 2022/0285705 A1    Sep. 8, 2022

(30) Foreign Application Priority Data

Mar. 4, 2021    (JP) .................................. 2021-034292

(51) Int. Cl.

| | | |
|---|---|---|
| H01M 8/04223 | (2016.01) | |
| H01M 8/04225 | (2016.01) | |
| H01M 8/04014 | (2016.01) | |
| H01M 8/0432 | (2016.01) | |
| H01M 8/04302 | (2016.01) | |
| H01M 8/04007 | (2016.01) | |

(52) U.S. Cl.
CPC ... *H01M 8/04253* (2013.01); *H01M 8/04014* (2013.01); *H01M 8/04067* (2013.01); *H01M 8/04225* (2016.02); *H01M 8/04268* (2013.01); *H01M 8/04302* (2016.02); *H01M 8/04365* (2013.01)

(58) Field of Classification Search
None
See application file for complete search history.

(56) References Cited

U.S. PATENT DOCUMENTS

| | | |
|---|---|---|
| 2004/0091827 A1 | 5/2004 | Sugawara et al. |
| 2018/0294493 A1 | 10/2018 | Ogawa et al. |
| 2021/0305600 A1* | 9/2021 | Koiwa .............. H01M 8/04201 |

FOREIGN PATENT DOCUMENTS

| | | |
|---|---|---|
| JP | 2004152529 A | 5/2004 |
| JP | 2008192514 A | 8/2008 |
| JP | 2018181484 A | 11/2018 |

* cited by examiner

*Primary Examiner* — Haroon S. Sheikh
(74) *Attorney, Agent, or Firm* — Dickinson Wright, PLLC

(57) ABSTRACT

A fuel cell system wherein, at the time of activating the fuel cell system, the controller determines whether or not the temperature of the fuel cell detected by the temperature sensor is equal to or less than a temperature corresponding to activation at sub-zero temperatures, and wherein, when the controller determines that the temperature of the fuel cell detected by the temperature sensor is equal to or less than the temperature corresponding to the activation at sub-zero temperatures, the controller sends a command to the fuel gas supplier to supply the fuel gas to the fuel cell, and the controller controls rotation of the circulation pump to stop a flow of the fuel off-gas in the circulation flow path.

2 Claims, 2 Drawing Sheets

FUEL CELL SYSTEM

TECHNICAL FILED

The disclosure relates to a fuel cell system.

BACKGROUND

A fuel cell (FC) is a power generation device that generates electrical energy by electrochemical reaction between fuel gas (e.g., hydrogen) and oxidant gas (e.g., oxygen) in a single unit fuel cell or a fuel cell stack (hereinafter, it may be referred to as "stack") composed of stacked unit fuel cells (hereinafter may be referred to as "cell"). In many cases, the fuel gas and oxidant gas actually supplied to the fuel cell, are mixtures with gases that do not contribute to oxidation and reduction. Especially, the oxidant gas is often air containing oxygen.

Hereinafter fuel gas and oxidant gas may be collectively and simply referred to as "reaction gas" or "gas". Also, a single unit fuel cell and a fuel cell stack composed of stacked unit cells may be referred to as "fuel cell".

In general, the unit fuel cell includes a membrane-electrode assembly (MEA).

The membrane electrode assembly has a structure such that a catalyst layer and a gas diffusion layer (or GDL, hereinafter it may be simply referred to as "diffusion layer") are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, the unit fuel cell includes two separators sandwiching both sides of the membrane electrode gas diffusion layer assembly. In general, the separators have a structure such that a groove is formed as a reaction gas flow path on a surface in contact with the gas diffusion layer. The separators have electronic conductivity and function as a collector of generated electricity.

In the fuel electrode (anode) of the fuel cell, hydrogen ($H_2$) as the fuel gas supplied from the gas flow path and the gas diffusion layer, is protonated by the catalytic action of the catalyst layer, and the protonated hydrogen goes to the oxidant electrode (cathode) through the electrolyte membrane. An electron is generated at the same time, and it passes through an external circuit, does work, and then goes to the cathode. Oxygen ($O_2$) as the oxidant gas supplied to the cathode reacts with protons and electrons in the catalytic layer of the cathode, thereby generating water. The generated water gives appropriate humidity to the electrolyte membrane, and excess water penetrates the gas diffusion layer and then is discharged to the outside of the system.

Various studies have been made on fuel cell systems configured to be installed and used in fuel cell electric vehicles (hereinafter may be referred to as "vehicle").

For example, Patent Literature 1 discloses a fuel cell system with enhanced low-temperature startability.

Patent Literature 2 discloses a fuel cell system capable of activation even under a low-temperature environment in which the backflow prevention valve of a circulation gas flow channel is frozen.

Patent Literature 3 discloses a fuel cell system capable of suppressing deterioration of a fuel cell.

Patent Literature 1: Japanese Patent Application Laid-Open (JP-A) No. -2004-152529
Patent Literature 2: JP-A No. 2008-192514
Patent Literature 3: JP-A No. 2018-181484

In a fuel cell system, when the fuel gas flow path in the fuel cell is frozen at the time of activation at sub-zero temperatures, it is desired to eliminate the freezing by use of, while supplying fuel gas, the heat of power generation using the fuel gas. Even while eliminating the freezing, in order to generate power, it is desired to prevent fuel gas deficiency in the fuel cell. Accordingly, it is necessary to supply fuel gas having high hydrogen concentration.

The fuel cell system of Patent Literature 1 is a system in which the fuel off-gas can freely circulate when the fuel gas flow path in the fuel cell is not completely closed. Accordingly, fuel gas containing nitrogen or the like and having low hydrogen concentration may be introduced into the fuel gas inlet of the fuel cell.

Also in Patent Literature 2, although the fuel gas having high hydrogen concentration is supplied from a bypass, the fuel off-gas circulate and the fuel gas having low hydrogen concentration may be introduced into the fuel cell via the ejector.

SUMMARY

The disclosed embodiments were achieved in light of the above-mentioned circumstances. An object of the disclosed embodiments is to provide a fuel cell system which is configured to supply fuel gas having high hydrogen concentration to a fuel cell even at the time of activation at sub-zero temperatures, which is configured to suppress the deterioration of a catalyst, which is configured to quickly eliminate freezing, and which is configured to increase fuel efficiency.

In a first embodiment, there is provided a fuel cell system, wherein the fuel cell system comprises:
a fuel cell,
a fuel gas supplier for supplying hydrogen-containing fuel gas to the fuel cell,
a fuel gas supply flow path connecting a fuel gas inlet of the fuel cell and the fuel gas supplier,
an ejector disposed in the fuel gas supply flow path,
a temperature sensor for detecting a temperature of the fuel cell,
a fuel off-gas discharge flow path for discharging, to the outside of the fuel cell system, the fuel off-gas discharged from a fuel gas outlet of the fuel cell,
a gas-liquid separator disposed in the fuel off-gas discharge flow path,
a vent and discharge valve disposed downstream from the gas-liquid separator of the fuel off-gas discharge flow path,
a circulation flow path connecting the gas-liquid separator and the ejector to allow the fuel off-gas to be supplied to the fuel cell as the circulation gas,
a circulation pump disposed in the circulation flow path to circulate the fuel off-gas as the circulation gas, and
a controller,
wherein, at the time of activating the fuel cell system, the controller determines whether or not the temperature of the fuel cell detected by the temperature sensor is equal to or less than a temperature corresponding to activation at sub-zero temperatures, and
wherein, when the controller determines that the temperature of the fuel cell detected by the temperature sensor is equal to or less than the temperature corresponding to the activation at sub-zero temperatures, the controller sends a command to the fuel gas supplier to supply the fuel gas to the fuel cell, and the controller controls rotation of the circulation pump to stop a flow of the fuel off-gas in the circulation flow path.

At the time of activating the fuel cell system or after an elapse of a predetermined period of time since the activation of the fuel cell system, the controller may determine whether or not the temperature of the fuel cell detected by the temperature sensor is equal to or less than the temperature corresponding to the activation at sub-zero temperatures, and when the controller determines that the temperature of the fuel cell detected by the temperature sensor exceeds the temperature corresponding to the activation at sub-zero temperatures, the controller may send a command to the fuel gas supplier to supply the fuel gas to the fuel cell, and the controller may control rotation of the circulation pump to circulate the fuel off-gas as the circulation gas.

According to the fuel cell system of the disclosed embodiments, the fuel gas having high hydrogen concentration can be supplied to the fuel cell even at the time of activation at sub-zero temperatures; the deterioration of the catalyst can be suppressed; the freezing can be quickly eliminated; and the fuel efficiency can be increased.

BRIEF DESCRIPTION OF THE DRAWINGS

In the accompanying drawings.

DETAILED DESCRIPTION

Figure 1:
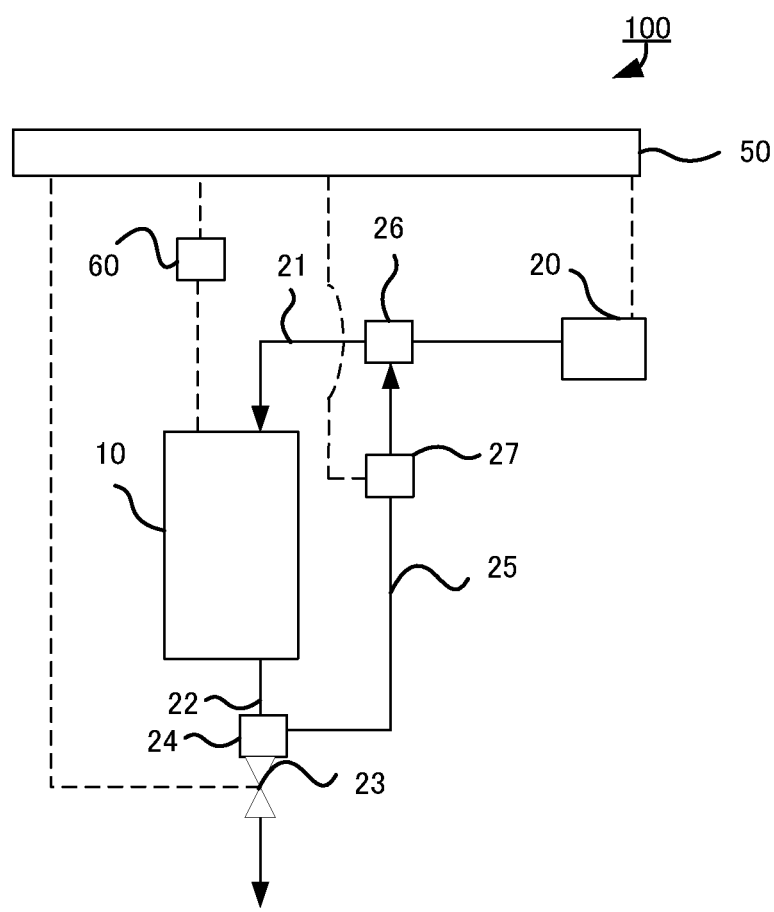
FIG. 1 is a schematic configuration diagram of an example of the fuel cell system of the disclosed embodiments.

The fuel cell system of the disclosed embodiments is a fuel cell system,
wherein the fuel cell system comprises:
a fuel cell,
a fuel gas supplier for supplying hydrogen-containing fuel gas to the fuel cell,
a fuel gas supply flow path connecting a fuel gas inlet of the fuel cell and the fuel gas supplier,
an ejector disposed in the fuel gas supply flow path,
a temperature sensor for detecting a temperature of the fuel cell,
a fuel off-gas discharge flow path for discharging, to the outside of the fuel cell system, the fuel off-gas discharged from a fuel gas outlet of the fuel cell,
a gas-liquid separator disposed in the fuel off-gas discharge flow path,
a vent and discharge valve disposed downstream from the gas-liquid separator of the fuel off-gas discharge flow path,
a circulation flow path connecting the gas-liquid separator and the ejector to allow the fuel off-gas to be supplied to the fuel cell as the circulation gas,
a circulation pump disposed in the circulation flow path to circulate the fuel off-gas as the circulation gas, and
a controller,
wherein, at the time of activating the fuel cell system, the controller determines whether or not the temperature of the fuel cell detected by the temperature sensor is equal to or less than a temperature corresponding to activation at sub-zero temperatures, and
wherein, when the controller determines that the temperature of the fuel cell detected by the temperature sensor is equal to or less than the temperature corresponding to the activation at sub-zero temperatures, the controller sends a command to the fuel gas supplier to supply the fuel gas to the fuel cell, and the controller controls rotation of the circulation pump to stop a flow of the fuel off-gas in the circulation flow path.

In a fuel cell system including a fuel gas circulation system that uses an ejector, when a pectinate flow path at the fuel gas outlet of a fuel cell are blocked by freezing of water droplets at the time of activation at sub-zero temperatures, it is necessary to supply fuel gas containing high concentration of hydrogen to the fuel cell, in order to quickly eliminate the freezing and blocking.

In the fuel gas circulation system using the ejector, when the fuel off-gas is circulated as usual, the concentration of hydrogen supplied to the fuel cell is decreased.

In the prior art, the fuel gas containing high concentration of hydrogen is supplied by use of a check valve and a bypass path. However, there is a possibility that at the time of activation at sub-zero temperatures, ice is caught in the check valve and allows the fuel gas to flow freely, resulting in poor fuel economy.

Since it is difficult to prevent the freezing and blocking of the pectinate flow path from occurring at the fuel gas outlet. Accordingly, it is necessary to enable the fuel cell system to supply the fuel gas containing high concentration of hydrogen to the fuel cell.

The defect caused by the freezing of the check valve cannot be recovered autonomously because, unlike the circulation pump, the check valve includes no moving parts.

In view of the above findings, the fuel cell system configured to supply the fuel gas having high hydrogen concentration to the fuel cell without relying on the check valve, was achieved.

According to the fuel cell system of the disclosed embodiments, at the time of activation at sub-zero temperatures, by controlling the rotation of the circulation pump not to circulate the fuel off-gas as the circulation gas, the fuel gas having high hydrogen concentration can be supplied to the fuel cell even at the time of activation at sub-zero temperatures; deterioration of the catalyst can be suppressed; the freezing can be quickly eliminated; and the fuel efficiency can be increased.

In the disclosed embodiments, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

In general, the fuel cell system of the disclosed embodiments is installed and used in a vehicle including a motor as a driving source.

The fuel cell system of the disclosed embodiments may be installed and used in a vehicle that can be run by the power of a secondary cell.

The motor is not particularly limited, and it may be a conventionally-known driving motor.

The vehicle may be a fuel cell electric vehicle.

The vehicle may include the fuel cell system of the disclosed embodiments.

The fuel cell system of the disclosed embodiments includes the fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum, (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the disclosed embodiments, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

The fuel cell system includes, as the fuel gas system of the fuel cell, the fuel gas supplier, the fuel gas supply flow path, the ejector, the temperature sensor, the fuel off-gas discharge flow path, the gas-liquid separator, the vent and discharge valve, the circulation flow path, the circulation pump, and the controller.

The fuel gas supplier supplies the hydrogen-containing fuel gas to the fuel cell. More specifically, the fuel gas supplier supplies the hydrogen-containing fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas supply flow path connects the fuel gas inlet of the fuel cell and the fuel gas supplier. The fuel gas supply flow path allows the fuel gas to be supplied to the anode of the fuel cell. The fuel gas inlet may be the fuel gas supply hole, the anode inlet manifold or the like.

In the fuel gas supply flow path, the ejector is disposed.

For example, the ejector may be disposed at a junction with the circulation flow path on the fuel gas supply flow path. The ejector supplies a mixed gas containing the fuel gas and circulation gas to the anode of the fuel cell. As the ejector, a conventionally-known ejector may be used.

The temperature sensor detects the temperature of the fuel cell.

The temperature of the fuel cell may be the temperature of the refrigerant circulating in and out of the fuel cell. The temperature sensor is electrically connected to the controller, and the controller detects the fuel cell temperature detected by the temperature sensor.

As the temperature sensor, a conventionally-known thermometer or the like may be used.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The gas-liquid separator (anode gas-liquid separator) is disposed in the fuel off-gas discharge flow path.

The gas-liquid separator may be disposed at the branch point of the fuel off-gas discharge flow path and the circulation flow path.

The gas-liquid separator is disposed upstream from the vent and discharge valve of the fuel off-gas discharge flow path.

The gas-liquid separator separates the water and fuel gas contained in the fuel off-gas, which is the fuel gas discharged from the fuel gas outlet. Accordingly, the fuel gas may be returned to the circulation flow path as the circulation gas, or unnecessary gas, water and the like may be discharged to the outside by opening the vent and discharge valve of the fuel off-gas discharge flow path. In addition, the gas-liquid separator can suppress the flow of excess water into the circulation flow path. Accordingly, the occurrence of freezing of the circulation pump or the like due to the water, can be suppressed.

The vent and discharge valve (the fuel off-gas discharge valve) is disposed in the fuel off-gas discharge flow path. The vent and discharge valve is disposed downstream from the gas-liquid separator in the fuel off-gas discharge flow path.

The vent and discharge valve allows the fuel off-gas, water and the like to be discharged to the outside (of the system). The outside may be the outside of the fuel cell system, or it may be the outside of the vehicle.

The vent and discharge valve may be electrically connected to the controller, and the flow rate of the fuel off-gas discharged to the outside may be controlled by controlling the opening and closing of the vent and discharge valve by the controller. By controlling the opening degree of the vent and discharge valve, the pressure of the fuel gas supplied to the anode of the fuel cell (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The circulation flow path connects the gas-liquid separator and the ejector.

The circulation flow path allows the fuel off-gas, which is the fuel gas discharged from the fuel gas outlet of the fuel cell, to be recovered and supplied to the fuel cell as the circulation gas.

The circulation flow path may branch from the fuel off-gas discharge flow path through the gas-liquid separator and connect to the ejector disposed in the fuel gas supply flow path, thereby joining the fuel gas supply flow path.

The circulation pump is disposed in the circulation flow path. The circulation pump circulates the fuel off-gas as the circulation gas. The circulation pump may be electrically connected to the controller, and the flow rate of the circulation gas may be controlled by controlling the turning on/off, rotational frequency, etc., of the circulation pump by the controller.

As the oxidant gas system of the fuel cell, the fuel cell system may include an oxidant gas supplier, an oxidant gas supply flow path, and an oxidant off-gas discharge flow path.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is driven according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold, or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The fuel cell system may include a refrigerant supplier and a refrigerant circulation flow path as the cooling system of the fuel cell.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is driven according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

The fuel cell system may include a secondary cell.

The secondary cell (battery) may be any chargeable and dischargeable cell. For example, the secondary cell may be a conventionally known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier and the like. The secondary cell may be rechargeable by a power source outside the vehicle, such as a household power supply. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be installed in the vehicle. The controller may be operable by an external power supply even if the ignition switch is turned off.

At the time of activating the fuel cell system, the controller determines whether or not the temperature of the fuel cell detected by the temperature sensor is equal to or less than the temperature corresponding to activation at sub-zero temperatures.

When the controller determines that the temperature of the fuel cell detected by the temperature sensor is equal to or less than the temperature corresponding to the activation at sub-zero temperatures, the controller sends a command to the fuel gas supplier to supply the fuel gas to the fuel cell, and the controller controls the rotation of the circulation pump to stop the flow of the fuel off-gas in the circulation flow path. As a result, the fuel gas having high hydrogen concentration can be supplied to the fuel cell, and frozen components such as the pectinate flow path at the fuel gas outlet of the fuel cell can be quickly unfrozen; the fuel cell system can be quickly warmed up; and the fuel efficiency can be increased.

The temperature corresponding to the activation at sub-zero temperatures may be 0° C. or less, for example, or it may be −10° C. or less.

To stop the flow of the fuel off-gas in the circulation flow path, the rotation of the circulation pump may be stopped, or the circulation pump may be rotated backward. The rotational frequency of the circulation pump in the case of rotating the circulation pump backward, is not particularly limited. It may be the same as or different from the rotational frequency of the circulation pump in the case of rotating the circulation pump forward.

At the time of activating the fuel cell system or after the elapse of the predetermined period of time since the activation of the fuel cell system, the controller may determine whether or not the temperature of the fuel cell detected by the temperature sensor is equal to or less than the temperature corresponding to the activation at sub-zero temperatures, and when the controller determines that the temperature of the fuel cell detected by the temperature sensor exceeds the temperature corresponding to the activation at sub-zero temperatures, the controller may send a command to the fuel gas supplier to supply the fuel gas to the fuel cell, and the controller may control the rotation of the circulation pump to circulate the fuel off-gas as the circulation gas.

To circulate the fuel off-gas as the circulation gas, the circulation pump may be rotated forward. In the case of rotating the circulation pump forward, the rotational frequency of the circulation pump is not particularly limited. It may be the same as or different from the rotational frequency of the circulation pump in the case of rotating the circulation pump backward.

The predetermined period of time since the activation of the fuel cell system, is not particularly limited. It may be just after the activation, after the elapse of a certain period of time, or after the elapse of a warm-up time during which the temperature of the fuel cell is supposed to exceed the temperature corresponding to the activation at sub-zero temperatures.

After the elapse of the predetermined period of time since the activation of the fuel cell system, the controller determines whether or not the temperature of the fuel cell detected by the temperature sensor is equal to or less than the temperature corresponding to the activation at sub-zero temperatures. Accordingly, the warming up of the fuel cell system can be quickly completed when the temperature of the fuel cell exceeds the temperature corresponding to the activation at sub-zero temperatures, and the fuel efficiency can be increased.

FIG. 1 is a schematic configuration diagram of an example of the fuel cell system of the disclosed embodiments.

A fuel cell system 100 shown in FIG. 1 includes a fuel cell 10, a fuel gas supplier 20, a fuel gas supply flow path 21, a fuel off-gas discharge flow path 22, a vent and discharge valve 23, a gas-liquid separator 24, a circulation flow path 25, an ejector 26, a circulation pump 27, a controller 50, and a temperature sensor 60. In FIG. 1, only the fuel gas system is illustrated, and other systems such as the oxidant gas system and the cooling system are not illustrated.

The temperature sensor 60 detects the temperature of the refrigerant flowing through the fuel cell 10. As indicated by a dashed line, the temperature sensor 60 is electrically connected to the controller 50 and sends the detected fuel cell temperature to the controller 50.

The gas-liquid separator 24 is disposed at the branch point of the fuel off-gas discharge flow path 22 and the circulation flow path 25. It separates the fuel gas and water from the fuel off-gas, which is the fuel gas discharged from the anode outlet, and returns the fuel gas to the circulation flow path 25 as the circulation gas.

The ejector 26 is disposed at a junction with the fuel gas supply flow path 21 of the circulation flow path 25.

The circulation pump 27 is disposed in the circulation flow path 25.

The controller 50 is electrically connected to the circulation pump 27, and it controls the rotation of the circulation pump 27 based on the result of detecting the temperature of the fuel cell.

The controller 50 is electrically connected to the fuel gas supplier 20, and it controls the fuel gas supply from the fuel gas supplier 20 based on the result of detecting the temperature of the fuel cell.

The controller 50 is electrically connected to the vent and discharge valve 23. As needed, it opens the vent and discharge valve 23 to discharge unnecessary gas, water and the like from the fuel off-gas discharge flow path 22 to the outside.

Figure 2:
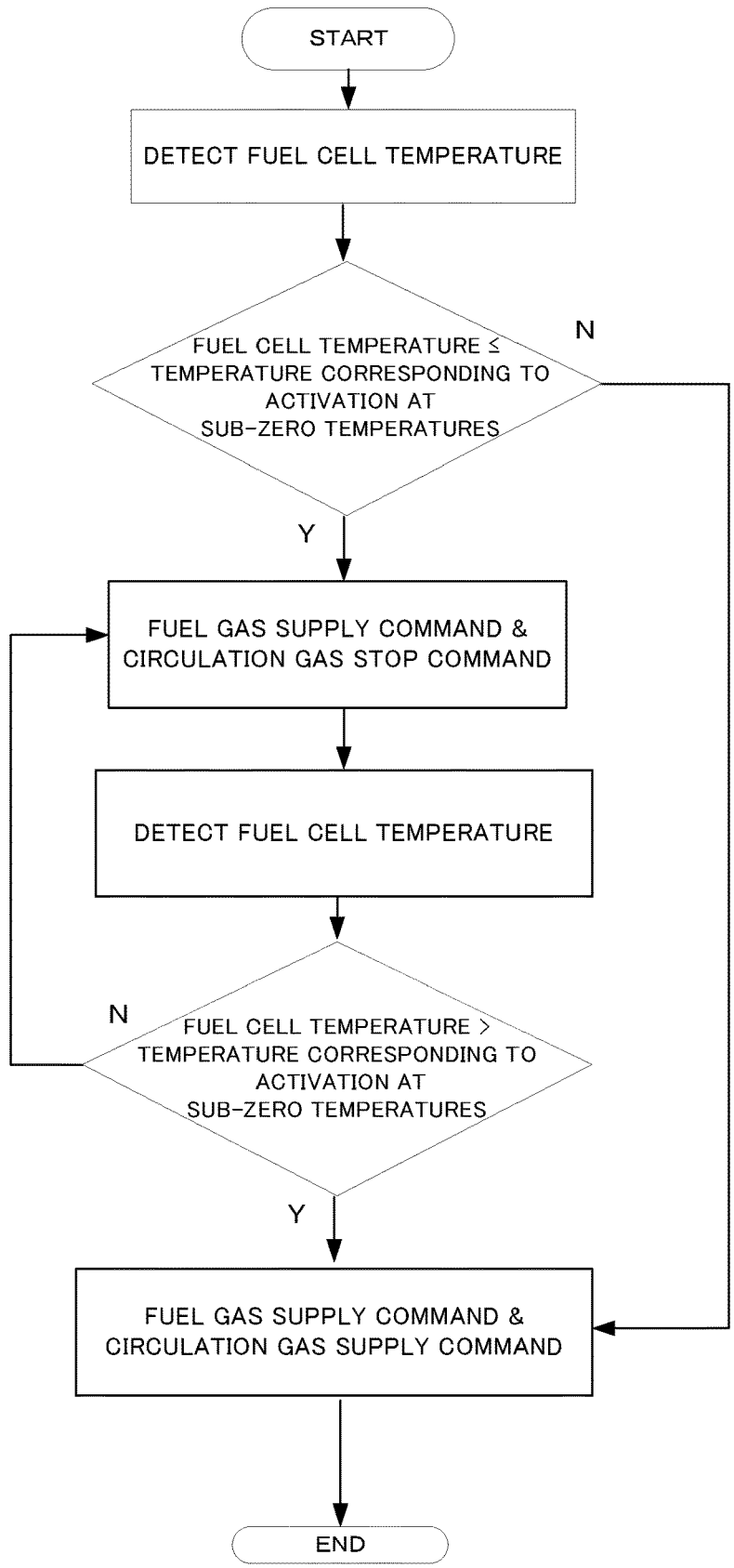
FIG. 2 is a flowchart illustrating an example of the control of the fuel cell system of the disclosed embodiments.

FIG. 2 is a flowchart illustrating an example of the control of the fuel cell system of the disclosed embodiments.

At the time of activating the fuel cell system, the temperature sensor detects the temperature of the fuel cell.

The controller determines whether or not the temperature of the fuel cell detected by the temperature sensor is equal to or less than the temperature corresponding to the activation at sub-zero temperatures.

When the controller determines that the temperature of the fuel cell detected by the temperature sensor exceeds the temperature corresponding to the activation at sub-zero temperatures, the controller sends a command to the fuel gas supplier to supply the fuel gas to the fuel cell, and the controller sends a circulation gas supply command to control the rotation of the circulation pump to circulate the fuel off-gas as the circulation gas. Then, the controller ends the control.

On the other hand, when the controller determines that the temperature of the fuel cell detected by the temperature sensor is equal to or less than the temperature corresponding to the activation at sub-zero temperatures, the controller sends a command to the fuel gas supplier to supply the fuel gas to the fuel cell, and the controller sends a circulation gas stop command to control the rotation of the circulation pump to stop the flow of the fuel off-gas in the circulation flow path.

Then, after the elapse of the predetermined period of time since the activation of the fuel cell system, the temperature sensor detects the temperature of the fuel cell again.

The controller determines again whether or not the temperature of the fuel cell detected by the temperature sensor is equal to or less than the temperature corresponding to the activation at sub-zero temperatures.

When the controller determines that the temperature of the fuel cell detected by the temperature sensor is equal to or less than the temperature corresponding to the activation at sub-zero temperatures, again, the controller sends a command to the fuel gas supplier to supply the fuel gas to the fuel cell, and the controller sends a circulation gas stop command to control the rotation of the circulation pump to stop the flow of the fuel off-gas in the circulation flow path.

On the other hand, when the controller determines that the temperature of the fuel cell detected by the temperature sensor exceeds the temperature corresponding to the activation at sub-zero temperatures, the controller sends a command to the fuel gas supplier to supply the fuel gas to the fuel cell, and the controller sends a circulation gas supply command to control the rotation of the circulation pump to circulate the fuel off-gas as the circulation gas.

REFERENCE SIGNS LIST

10: Fuel cell
20: Fuel gas supplier
21: Fuel gas supply flow path
22: Fuel off-gas exhaust flow path
23: Vent and discharge valve
24: Gas-liquid separator
25: Circulation flow pass
26: Ejector
27: Circulation pump
50: Controller
60: Temperature sensor
100: Fuel cell system

The invention claimed is:

1. A fuel cell system,
wherein the fuel cell system comprises:
a fuel cell,
a fuel gas supplier for supplying hydrogen-containing fuel gas to the fuel cell,
a fuel gas supply flow path connecting a fuel gas inlet of the fuel cell and the fuel gas supplier,
an ejector disposed in the fuel gas supply flow path,
a temperature sensor for detecting a temperature of the fuel cell,
a fuel off-gas discharge flow path for discharging, to the outside of the fuel cell system, the fuel off-gas discharged from a fuel gas outlet of the fuel cell,
a gas-liquid separator disposed in the fuel off-gas discharge flow path,
a vent and discharge valve disposed downstream from the gas-liquid separator of the fuel off-gas discharge flow path,
a circulation flow path connecting the gas-liquid separator and the ejector to allow the fuel off-gas to be supplied to the fuel cell as the circulation gas,
a circulation pump disposed in the circulation flow path to circulate the fuel off-gas as the circulation gas, and
a controller,
wherein, at the time of activating the fuel cell system, the controller determines whether or not the temperature of the fuel cell detected by the temperature sensor is equal to or less than a temperature corresponding to activation at sub-zero temperatures, and
wherein, when the controller determines that the temperature of the fuel cell detected by the temperature sensor is equal to or less than the temperature corresponding to the activation at sub-zero temperatures, the controller sends a command to the fuel gas supplier to supply the fuel gas to the fuel cell, and the controller controls rotation of the circulation pump to stop a flow of the fuel off-gas in the circulation flow path.

2. The fuel cell system according to claim 1, wherein, at the time of activating the fuel cell system or after an elapse of a predetermined period of time since the activation of the fuel cell system, the controller determines whether or not the temperature of the fuel cell detected by the temperature sensor is equal to or less than the temperature corresponding to the activation at sub-zero temperatures, and
wherein, when the controller determines that the temperature of the fuel cell detected by the temperature sensor exceeds the temperature corresponding to the activation at sub-zero temperatures, the controller sends a command to the fuel gas supplier to supply the fuel gas to the fuel cell, and the controller controls rotation of the circulation pump to circulate the fuel off-gas as the circulation gas.

* * * * *